United States Patent [19]

Suzuki et al.

[11] 4,256,047
[45] Mar. 17, 1981

[54] ERROR INDICATION ARRANGEMENT FOR USE IN A SEWING MACHINE

[75] Inventors: Kazuo Suzuki, Higashiosaka; Hirokazu Koda, Gose; Kenichi Nakamura, Nara; Syuich Yoshikawa, Yamatokooriyama; Naoki Ohara, Toyota, all of Japan

[73] Assignees: Sharp Kabushiki Kaisha, Osaka; Seiki Kabushiki Kaisha, Aichi, both of Japan

[21] Appl. No.: 48,226

[22] Filed: Jun. 13, 1979

[30] Foreign Application Priority Data

Jun. 13, 1978 [JP] Japan .................................. 53-71716

[51] Int. Cl.³ .............................................. D05B 3/02
[52] U.S. Cl. ............................ 112/158 E; 112/158 F; 112/277
[58] Field of Search ............ 112/158 E, 158 B, 158 F, 112/158 R, 158 A, 158 D, 277, 275, 121.12

[56] References Cited

U.S. PATENT DOCUMENTS

| | | | |
|---|---|---|---|
| 4,064,817 | 12/1977 | Sawada et al. | 112/158 F |
| 4,075,961 | 2/1978 | Harris | 112/277 |
| 4,161,918 | 7/1979 | Dunn | 112/158 E |

*Primary Examiner*—Peter P. Nerbun
*Attorney, Agent, or Firm*—Birch, Stewart, Kolasch & Birch

[57] ABSTRACT

A zigzag sewing machine of a sewing pattern selectable type is disclosed having a cloth advancing mechanism for advancing a cloth at a predetermined pitch after every one stitch and a pitch control dial for controlling the length of said pitch. A plurality of indication lamps are provided for producing a warning signal when an erroneous combination between the cam selection and pitch adjustment is constituted.

5 Claims, 8 Drawing Figures

ERROR INDICATION ARRANGEMENT FOR USE IN A SEWING MACHINE

The present invention relates to an electric sewing machine and, more particularly, to an indication arrangement for use in the sewing machine.

Recently, there have been proposed various types of electrically operated sewing machines which provide a number of patterns of zig-zag sewing. The patterns are basically determined by two factors which are: the lateral movement of the thread carrying needle; and the pitch of advance or retreat of the cloth effected between the two succeeding stitches. The first factor, that is, the lateral needle movement, is generally controlled by a cam which is selected from a number of different cams, while the second factor, that is, the pitch of advance of the cloth, is controlled by a suitable pitch adjusting means such as a dial incorporated in the sewing machine.

In the conventional sewing machine, the pitch control dial can be dialed to a position for advancing the cloth at a predetermined pitch or to a position for advancing the cloth at a varying pitch. Therefore, by changing the combination between the cam selection and the pitch of the cloth advance, it is possible to obtain a number of different sewing patterns. There are, however, combinations which are not appropriate for carrying out sewing operation. Such combination, hereinafter referred to as an erroneous combination, takes place when a cam for button hole sewing is selected and, at the same time, the cloth advance control dial is set to the position of varying pitch.

Accordingly, it is a primary object of the present invention to provide a circuit for producing a warning signal when such an erroneous combination is established.

It is another object of the present invention to provide a warning circuit of the above described type which is simple in construction and can readily be manufactured at low cost.

According to the present invention there is provided a sewing machine having a thread carrying needle which is reciprocated in an axial direction thereof and is jogged in a lateral direction, a cloth advancing mechanism for advancing a cloth in a direction perpendicular to the lateral direction at a controlled pitch for forming a pattern of stitches, said sewing machine comprising: a plurality of individual pattern information carrying means each provided for controlling the lateral movement of the thread carrying needle, at least one pattern information carrying means being provided for effecting button hole sewing; means for selecting any one of said pattern information carrying means; means for producing a selected signal indicative of the selected pattern information carrying means; means for adjusting the pitch of cloth advance, said adjusting means having at least two adjusting positions in which the first adjusting position is established for advancing the cloth at zero or a predetermined constant pitch, while the second adjusting position is established for advancing the cloth at a predetermined varying pitch; warning signal producing means; and circuit means connected between the selected signal producing means and the warning signal producing means for producing the warning signal when the adjusting means is positioned to the second adjusting position and, at the same time, the pattern information carrying means for button hole sewing is selected.

These and other objects and features of the present invention will become apparent from the following description taken in conjunction with preferred embodiments thereof with reference to the accompanying drawings, in which.

Before the description of the present invention proceeds, it is to be noted that like parts are designated by like reference numerals throughout the accompanying drawings.

Figure 1:
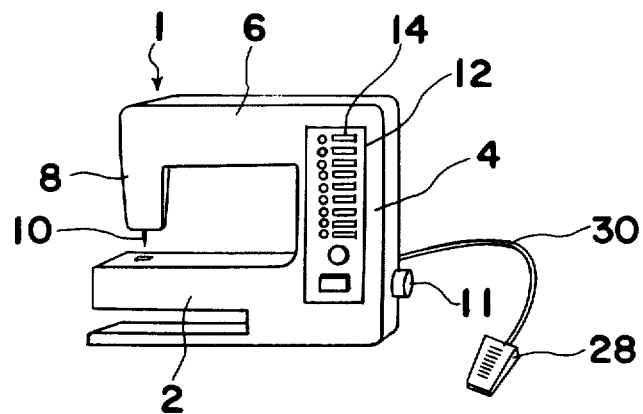
FIG. 1 is a perspective view of a sewing machine according to the present invention.
Figure 2:
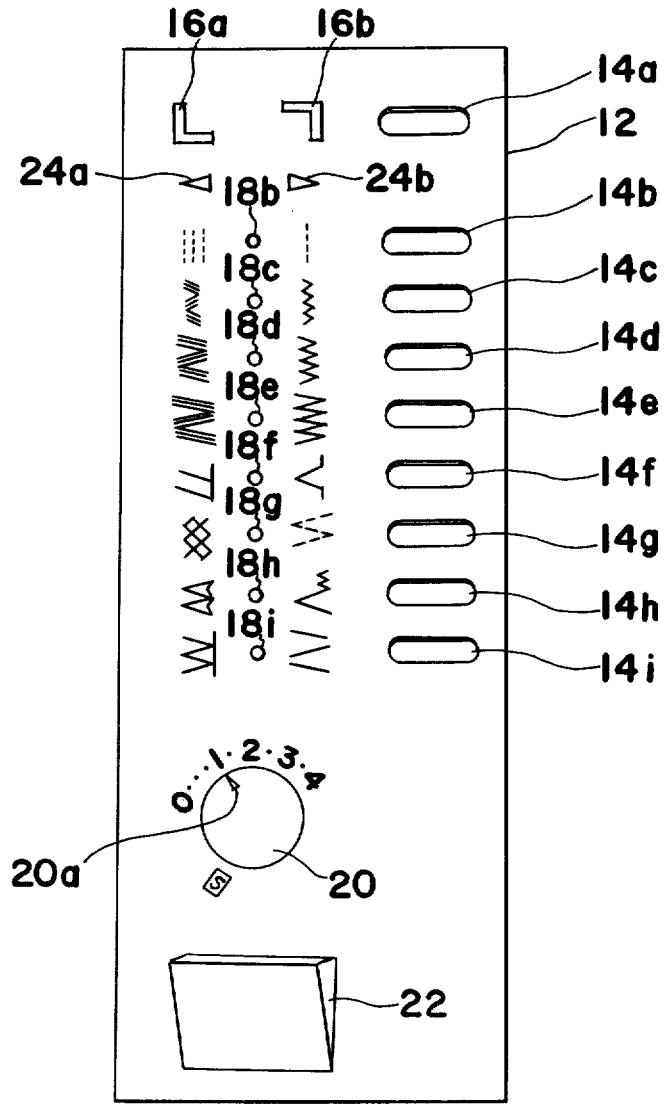
FIG. 2 is a fragmentary view of a control panel provided in a frame of the sewing machine.

Referring to FIG. 1, a sewing machine 1 includes a bed 2 from which rises a standard 4 supporting a bracket arm 6 overhanging the bed 2. The arm 6 supports a head 8 which has a needle 10 projecting outwardly and downwardly towards the bed 2. Disposed on the front surface of the standard 4 is control panel 12, as best shown in FIG. 2, including a plurality of, for example, nine buttons 14a to 14i, two indication lamps 16a and 16b for the first select button 14a which is provided for the button hole sewing, eight indication lamps 18a to 18h for the selected buttons 14b to 14i, respectively, a sewing pitch control dial 20 and a button 22 for effecting a retreat movement of the cloth. The sewing pitch control dial 20 has an index arrow 20a which is, as the dial 20 is rotated, selectively brought in register with character S and numerical markings scaled adjacent to and around the dial 20. When the arrow 20a points "0", the cloth under the needle 10 is held standstill so that the needle 10 can carry out the sewing repeatedly on the same place of the cloth. Upon rotation of the dial 20 to bring the index arrow 20a in register with one of the numerical markings, the cloth is advanced in a predetermined sewing pitch determined by the position of the dial 20 so rotated. The sewing pitch is greater as the weight of the numerical markings increases larger. When the dial 20 is rotated to a position S, the sewing pitch is controlled to cause the cloth to advance at a varying pitch.

Two groups of sewing patterns are shown one on each side of a column of the indication lamps 18a to 18i. The sewing patterns of one group shown on the right-hand side of the respective lamps 18a to 18i are obtained when the arrow 20a is in register with one of the numerical markings whereas the sewing patterns of the other group shown on the left-hand side of the respective lamps 18a to 18i are obtained when the arrow 20a is in register with the character S. For the identification, a lamp 24a is lit when the arrow 20a points the character S and a lamp 24b is lit when the arrow 20a points one of the numerals "0" to "4".

Figure 3:
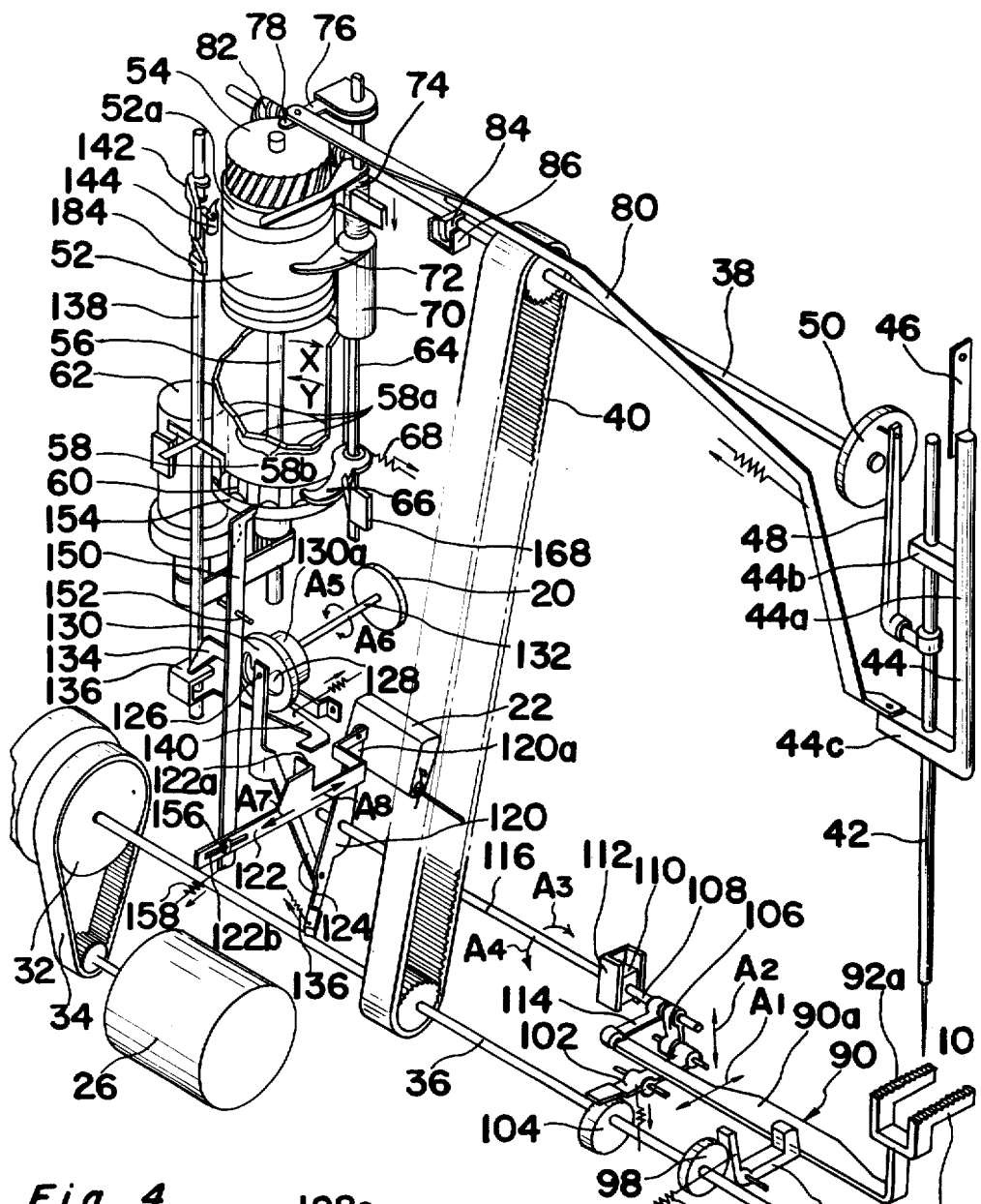
FIG. 3 is a schematic view of a needle actuating mechanism and a cloth moving mechanism which are incorporated in the sewing machine shown in FIG. 1.

Referring to FIG. 3, there is shown a mechanism of the sewing machine 1. The mechanism can be briefly divided into first and second sections, the first section being a needle actuating mechanism while the second section is cloth moving mechanism. Each of such mechanism is actuated by a motor 26 which is controlled by a foot-switch 28 connected to the machine 1 through a cable 30, as shown in FIG. 1. The rotation of the motor 26 is transmitted to a fly-wheel 32 through an endless belt 34. The fly-wheel 32 is rigidly mounted on a shaft 36 which is in common with a main shaft for the cloth moving mechanism. This shaft 36 is connected to another shaft 38 for the needle actuating mechanism through an endless belt 40 so that the shafts 36 and 38 can be rotated simultaneously with each other during rotation of the motor 26. Instead of the motor 26, shafts 36 and 38 can be rotated manually upon rotation of a dial 11 (FIG. 1) provided on the side of the sewing machine 1. Each mechanism is described in detail hereinbelow.

Needle actuating mechanism

The thread carrying needle 10 is affixed to a needle bar 42 which is slidably supported by an F-shaped framework 44 having an up-right bar 44a and two parallel bars 44b and 44c extending laterally from the bar 44a. The needle bar 42 is slidably inserted through holes formed in the bars 44b and 44c. A rectangular spring plate 46 has one end connected to the upper end of the up-right bar 44a and the other end connected to the frame of the sewing machine, whereby the F-shaped framework can undergo a swinging motion. At an intermediate portion between the bars 44b and 44c, the needle bar 42 is tightly held by a link 48 which is connected to a crank 50 mounted on the shaft 38. Therefore, the rotation of the shaft 38 is converted into the reciprocal movement of the needle bar 42 by the crank 50. The lateral jogging movement of the needle 10 can be obtained by the swing motion of the F-shaped framework 44. This swing motion is controlled by a cam mechanism.

The cam mechanism includes a plurality of cams 52 placed one above the other and rigidly connected to each other. Such cam arrangement 52 is also rigidly connected to a spur gear 54 and is rotatably mounted on a shaft 56 so that the gear 54 rotates together with the cam arrangement freely about the shaft 56. A rod 64 having a rectangular cross section is provided adjacent the cam arrangement 52 with it opposite ends rotatably journalled to the frame of the sewing machine. Mounted on the rod 64 is a cylindrical arm carrier 70 which slidably displaces along the rod 64. A step-formed drum 58 is rigidly mounted on the shaft 56 while a timing cam 60 is also rigidly mounted on the shaft 56. Since an upper annular end of the drum 58 is formed with a generally helical cam face composed of a plurality of steps 58a and a corresponding number of slopes 58b each positioned between every adjacent two of the steps 58a, the arm carrier 70 having its lower end resting on the upper annular end face of the drum descends or elevates along the rod 64 as the drum 58 is rotated in a direction as shown by the arrow X or in a direction as shown by the arrow Y, respectively, about the shaft 56 by a motor 62 connected to the shaft 56. The step-formed drum 58 is provided for supporting the cylindrical arm carrier 70 at a desired level. The position of the drum 58 shown in FIG. 3 supports the carrier 70 at the highest level. Upon rotation of the drum 58 in the direction X by the actuation of the motor 62, the carrier 70 is gradually lowered.

An arm 66 is mounted on the rod 64 at a position adjacent the timing cam 60 by means of a clicking clutch means (not shown), said clicking clutch means being so designed as to enable the arm 66 to rotate clockwise about and independently of the rod 64 and also to rotate counterclockwise together with the rod 64. A free end of the arm 66 remote from the rod 64 is engaged to the timing cam 60.

A spring 68 is connected to the arm 66 to bias the arm 66 and the rod 64 to rotate in a clockwise direction when viewed from top. The cylindrical shaped arm carrier 70 is slidably mounted on the rod 64 and carries an arm or cam follower 72 also mounted on the rod 64. A coil spring 74 mounted on the rod 64 biases the arm 72 and the arm carrier 70 downwardly with a bottom end of the arm carrier 70 held in contact with a stepped upper edge of the drum 58. Since the upper edge of the drum 58 is provided with steps 58a and slopes 58b, the rotation of the drum 58 moves the carrier 70 along the rod 64 to vary the level of the carrier 70. When the carrier 70 is slid along the slope 58b defined between every two neighboring steps 58a in the drum 58 for changing the level thereof, the arm 66 slides over a corresponding projecting portion of the timing cam 60. Thus, the arm 66 is pivoted by the rotation of the shaft 64 in a counterclockwise direction. In other words, during the movement of the carrier 70 along the rod 64 with its lower end sliding in contact with any one of the slopes 58b in the drum, a free end of the arm 66 slides over a corresponding one of the projections of the timing cam 60. Therefore, during the displacement of the arm 72 in the vertical direction, the arm 72 is disengaged from the cam arrangement 52.

On the other hand, when the carrier 70 is in contact with a flat edge or step 58a of the drum 58, the arm 66 is positioned in a recess defined between the two neighboring projections of the timing cam 60 and, hence, the arm 72 is held in contact with one of the cams in the cam arrangement 52. Rigidly mounted at upper portion of the shaft 64 is a disc plate 76 having a projection 78. This projection 78 is pivotally connected to a bar member 80 which extends to the bar 44c of the F-shaped framework 44. A worm gear 82 is mounted on the shaft 38 and is engaged to the spur gear 54 so that the rotation of the shaft 38 during the sewing operation is transmitted through the spur gear 54 to the cam arrangement 52.

The operation of the needle actuating mechanism is described hereinbelow.

Upon one rotation of the shaft 38, the needle 10 undergoes one reciprocation. Also the rotation of the shaft 38 causes the rotation of the cam arrangement 52 through the engagement between the worm gear 82 and the spur gear 54. The rotation of the cam arrangement 52 causes a jogging movement of the cam follower 72 by following projecting lobes or recessed stations and, thus, the projection 78 is jogged accordingly. This jogging movement is transmitted to the F-shaped framework 44 through the bar member 80 to swing the needle 10 laterally. Thus, the zig-zag sewing can be effected according to a pattern determined by the selected cam in the cam arrangement 52 to which the arm 72 is then engaged. When it is necessary to change the cam, that is, to change the level of the arm 72, the motor 62 is turned on by a suitable switch means such as the one electrically coupled to the buttons 14a to 14h in a manner as will be described in detail later with reference to FIG. 6. When the motor 62 is so turned on, the shaft 56 is rotated to rotate the drum 58 and the timing cam 60. The rotation of the timing cam 60 causes the arm 66 to jog accordingly while the rotation of the drum 58 moves the cam follower 72 up or down together with the carrier 70 along the shaft 64. Since the vertical displacement of the cam follower 72 is carried out during the movement of the arm 66 over the projecting portion of the timing cam 60, the cam follower 72 is held clear of the cam arrangement 52.

Cloth moving mechanism

A rack member 90 having a pair of saw tooth edges 92a and 92b and an elongated bar portion 99a is movably accommodated in the bed 2 of the sewing machine 1. An L-shape block 96 journalled to the frame of the sewing machine has one end portion held in contact with one side edge of the bar portion 90a while the other end portion thereof is held in contact with a disc 98 which is eccentrically rigidly mounted on the shaft 36. The L-shaped block 96 is normally biased in one direction by a spring 100 with said other end portion thereof held in contact with the disc 98. Upon rotation of the shaft 36, the L-shaped block 96 is rocked to provide a lateral movement force to the rack member 90 in a direction as indicated by the arrow A1 in FIG. 3.

An elongated seesaw plate 102 pivotally supported at its substantially intermediate portion by a pin is provided adjacent the L-shaped block 96. This plate 102 has one end overlaying and engaged to a peripheral face of a disc 104 which is eccentrically rigidly mounted on the shaft 36. The other end portion of the plate 102 is hingedly connected to one end of an arm 106. The other end of the arm 106 is also hinged to a bar 108 which extends from a cubic block 110 slidably accommodated in a casing 112 of a substantially U-shaped cross section. The end of the bar portion 90a of the rack member 90 remote from the saw tooth edges 92a and 92b is hinged to one end of an arm 114 while the other end of the arm 114 is also hinged to the bar 108. In this construction, during the rotation of the shaft 36, the plate 102 undergoes a seesaw motion to move the bar 108 vertically in a direction as indicated by the arrow A2 in FIG. 3.

When the groove in the casing 112 is vertically oriented such as shown in FIG. 3, the bar 108 vertically moves as the cubic block 110 reciprocates in the groove of the casing 112. In this case, the rack member 90 is moved only in a vertical direction A2. Therefore, the cloth positioned above the saw tooth edges is held standstill. When the groove in the casing 112 is slanted in one direction as a result of rotation of a shaft 116 connected to the casing 112 in a direction as indicated by an arrow A3, the cubic block 110 reciprocates accordingly along the groove in the casing 112. In this case, the rack member 90 undergoes such a motion that an end portion of the bar portion 90a of the rack member 90 adjacent the toothed edges 92a and 92b describes an oval orbit in a counterclockwise direction, when viewed from the right-hand end, whereby the cloth is advanced. The pitch of advance is controlled by the setting of the sewing pitch control dial 20 which determines the angle through which the casing 112 reciprocatingly rotates together with the shaft 116.

On the other hand, when the groove in the casing 112 is slanted in the other direction as a result of rotation of the shaft 116 in a direction as indicated by the arrow A4, the cubic block 110 reciprocates accordingly along the groove for causing the rack member 90 to move following a similar oval orbit in a clockwise direction when view from the right-hand end. In this case, the cloth is retreated. The manner in which the rotation of the shaft 116 is controlled is described hereinbelow.

Figure 4:
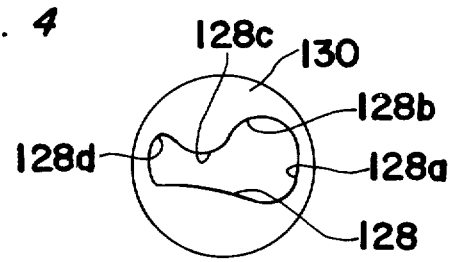
FIG. 4 is a plan view of a disc shown in FIG. 3.

An elongated plate 120 is rigidly connected to the end of the shaft 116 remote from the casing 112. One end portion 120a of the plate 120 is pivotally connected to a plate 122, so that the plate 122 moves laterally as a result of rotation of the plate 120. The other end portion of the plate 120 is pivotally connected to a plate 124 which has a pin projection 126 at the end thereof remote from the plate 120. This pin projection 126 is engaged to an edge of a detent recess 128 formed in a disc plate 130. The recess 128 as best shown in FIG. 4 has a predetermined pattern defined by portions 128a, 128b, 128c and 128d. The disc 130 is eccentrically connected to a shaft 132 which in turn is connected to the dial 20 described above. Since the plate 120 is biased by a spring 134 about the shaft 116 in a clockwise direction when viewed from right, the pin projection 126 is held in contact with an upper edge of the detent recess 128. When the disc 130 is held in a position as shown in FIG. 3, the edge portion 128b of the recess 128 is held in contact with the pin projection 126. It is to be noted that the engagement of the pin projection 126 at the portion 128b brings the casing 112 in a position with the groove thereof oriented in a vertical direction as shown. At this time, the dial 20 is in position with the arrow 20a held in register with the "0" marking. Upon rotation of the disc 130 in a direction A5, the pin projection 126 comes into contact with the portion 128a of the recess 128. Therefore, the plate 124 is raised upwardly to allow rotation of the shaft 116 in the direction A3. Thus, the casing 112 is slanted to effect the orbitary movement of the rack member 90 in such a manner as to advance the cloth. At this time, the dial 20 is in position with the arrow 20a held in register with one of the numeral markings.

The disc 130 is coupled with an auxiliary disc 130a having a smaller diameter than that of the disc 130. This auxiliary disc 130a is also eccentrically connected to the shaft 132. Provided under the auxiliary disc 130a is an arm 134 having one end portion pivotally connected to the frame of the sewing machine while the other end is held in contact with a platform 136 slidably mounted on a shaft 138 extending in parallel to the shaft 56. An arm 140 extends from the platform 136 with the free end thereof normally terminating adjacent and above a face 122a formed in the plate 122. Since the arm 140 is rigidly connected to the shaft 138, the rotation of the arm shaft 140 accordingly results in rotation of the arm 140. Another arm 142 is also rigidly mounted on the shaft 138 at upper portion thereof. This arm 142 is held in contact with a hinged V-shaped block 144 which is in turn held in contact with the uppermost cam 52a in the cam arrangement 52. The uppermost cam 52a is provided for controlling the cloth movement. The rotation of the cam arrangement 52 results in a jogging motion of the V-shaped block 144 and also the arm 142. Therefore, the shaft 138 is rotated. This rotation of the shaft 138 is transmitted to the arm 140. Normally, since the arm 140 is free from any element, the rotation or jogging movement of the arm 140 is not transmitted to further element. When the dial 20 is turned to a direction A6, however, the recess 128 is rotated to push down the plate 124 as the pin projection 126 slides along the portion 128c. Therefore, the plate 122 is forcibly pushed to a direction A7. The further rotation of the dial 20 in the direction A6 pushes down the arm 134 by the auxiliary disc 130a, so that the platform 136 is pushed down to lower the arm 140. Thereafter, the pin projection 126 slides into the portion 128d to substantially raise the plate 124 for moving the plate 122 towards the direction A8. As a consequence, the face 122a of the plate 122 comes into contact with the free end of the arm 140. It is to be noted that this is effected as the dial 20 is brought to a position with the arrow 20a registered with the "S" marking. The establishment of such connection between the arm 140 and the face 122a transmits the jogging movement of the arm 140 through the plates 122 and 120 to the shaft 116, so that the casing 112 is slanted in the direction A3 or A4 with respect to the jogging of the arm 140. Thus, the movement of the cloth is varied.

Figure 5:
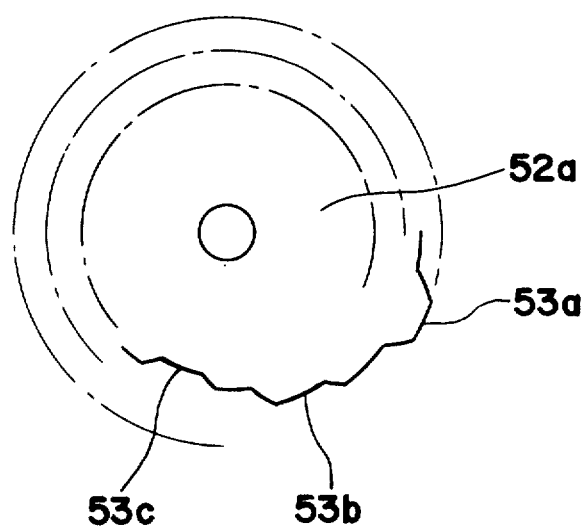
FIG. 5 is a plan view of a cam for controlling the cloth movement.

Referring to FIG. 5, there is shown one example of the cloth moving cam 52a having most projecting portion 53a, normal level portion 53b and recessed portion 53c. When the V-shaped block 144 slides over the projecting portion 53a, the shaft 116 is turned to the direction A4 to retreat the cloth. When the V-shaped block 144 slides over the normal level portion 53b, the shaft 116 is held in such a position as to maintain the casing 112 vertically as shown in FIG. 3, and when the V-shaped block 144 slides over the recessed portion 53c, the shaft 116 is turned to the direction A3 for advancing the cloth.

An elongated plate 150 is pivotally supported by a pin 152 with upper end thereof held in contact with a cam 154 positioned under the timing cam 60 and rigidly mounted on the shaft 56. The other end of the plate 150 is provided with a pin projection 156 which is slidably accommodated in an elongated groove 122b formed in the plate 122. A spring 158 is provided for urging the upper end of the plate 150 to the cam 154. Since the biasing force of the spring 158 is larger than that of the spring 136, the movement of the plate 122 particularly in the direction A8 is restricted by the plate 150. In other words, the pin projection 156 limits the lateral movement of the plate 122 within a distance defined by the effective length of the groove 122b between the pin projection 156 and the left end of the groove 122b. For example, when carrying out a straight stitch, the upper end of the plate 150 will be held in contact with the most projecting portion of the cam 154 so that the effective length of the groove 122b between the pin projection 156 and the left end of the groove 122b will be considerably large. Thus, upon rotation of the dial 20 to a large numbered position, the shaft 116 can be turned to the direction A3 through a large angle. In other words, stitching is effected at an interval of a relatively large pitch while the cloth is advanced. By all means, it is possible to advance the cloth with a small pitch for this straight stitch by simply turning the dial 20 to a smaller number. On the other hand, when carrying out a button hole stitch, it is necessary to stitch the same place repeatedly. In this case, the upper end of the plate 150 will be held in contact with the most detent portion of the cam 154 so that the effective length of the groove 122b between the pin projection 156 and the left end of the groove 122b will be zero. Therefore, the plate 122 will not be moved to the direction A8 so as to incline the casing 112 in the direction A3, regardless of turning of the dial 20.

The button 22 is position adjacent the upper end of the plate 120 for allowing, when the button 22 is pushed, the shaft 116 to rotate in the direction A4. Thus, the retreat movement of the cloth can be effected during the pushing of the button 22.

According to the sewing machine described above, various sewing patterns are available by simply changing the combination of the cam selected from the cam arrangement 52 and the pitch of the cloth advance, that is, the combination between the switch button and the dial 20. Among various combinations, however, there is a combination which is not accepted for carrying out a proper sewing operation. Such erroneous combination occurs when button switch 14a is selected and at the same time the dial 20 is brought to a position with the arrow 20a in register with the "S" marking. In other words, it is not proper to advance the cloth in a varying pitch during the selection of button hole stitches. According to the present invention, a blinking light as a warning signal is effected when such erroneous combination is established. The manner in which the blinking light is produced is described in detail in connection with FIG. 6 showing a control circuit for the sewing machine.

Figure 6:
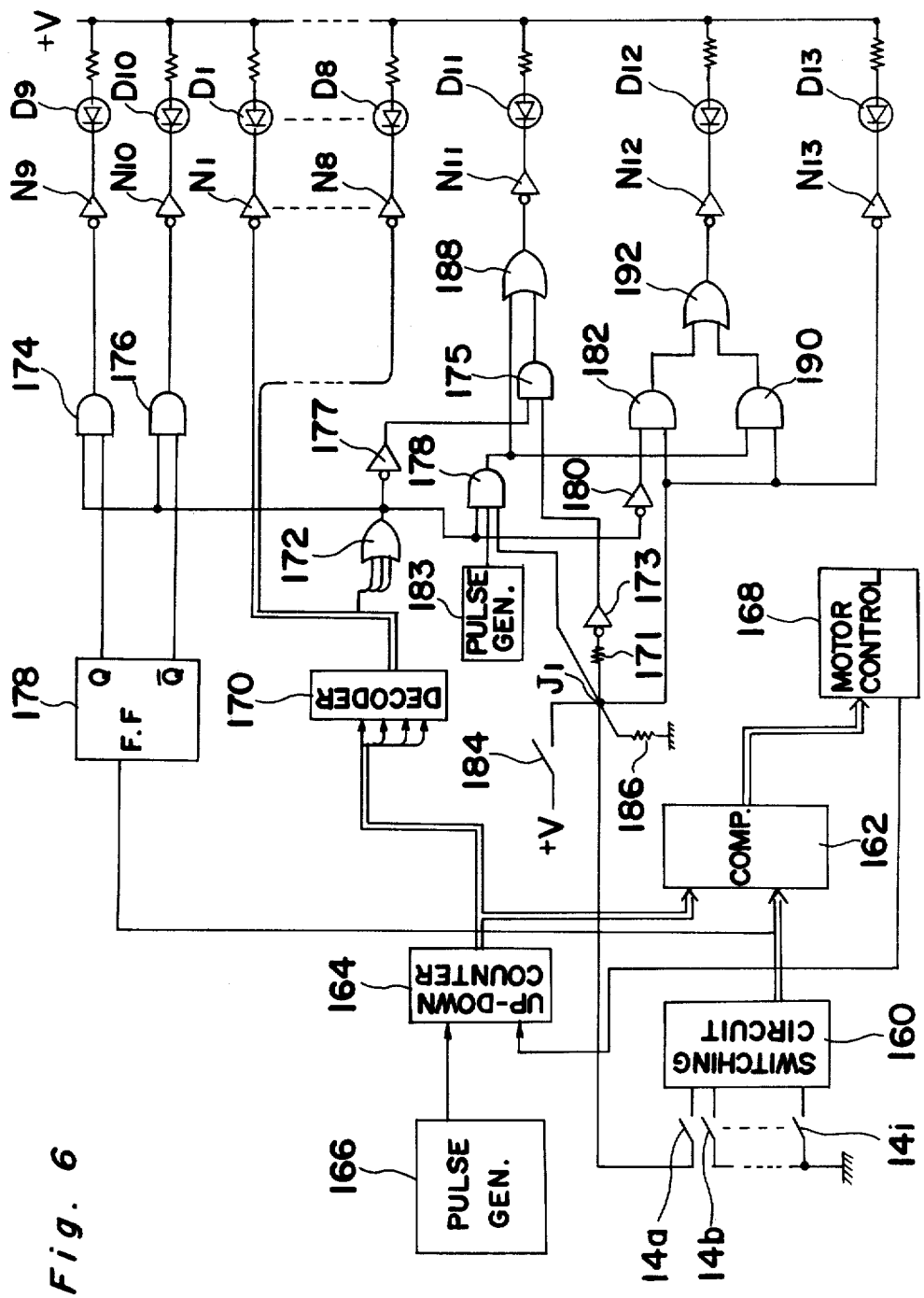
FIG. 6 is a circuit diagram, partly shown in blocks, incorporated in the sewing machine for controlling lights on the control panel shown in FIG. 2.

Referring to FIG. 6, there is shown a block diagram of a control circuit for controlling the mechanism described above. The control circuit includes a switching circuit 160 which produces a binary coded decimal (BCD) signal upon receipt of high level signal from one of the push button switches 14a to 14i described above. For example, when the first button switch 14a is turned on, BCD signal indicative of "1" is produced from the switch circuit 160. Similarly, when the second button switch 14b is turned on, BCD signal indicative of "2" is produced, and so on. Such BCD signal from the circuit 160 is applied to a comparator 162 in which the BCD signal is compared with a similar BCD signal from an up-down counter 164. The up-down counter 164 counts up or down each time a pulse signal is applied thereto from a pulse generator 166. The pulse generator 166 is constituted by a reed switch 168 (FIG. 3) positioned closely adjacent the arm 66. The reed switch 168 is turned on when the arm 66 is pushed in a counterclockwise direction by the contact between the arm 66 and the projecting portion of the timing cam 60. Since the projecting portion of the timing cam 60 pushes the arm 66 each time the arm 72 is shifted one step higher or lower from the present position, the pulse from the pulse generator 166 indicates a step change in the cam selection. Therefore, the up-down counter 164 produces the BCD signal indicative of the position of the arm 72 with respect to the cam arrangement 52. For example, when the arm 72 is positioned in alignment with the uppermost cam, the up-down counter 164 produces the BCD signal indicative of "1". Thereafter, if the arm 72 is moved to the second cam from the uppermost one, the pulse generator 166 generates a pulse to count up the contents of the counter 164 from "1" to "2". Therefore, at the moment when the arm 72 is positioned in alignment with the second cam from the uppermost one, the up-down counter 164 produces the BCD signal indicative of "2". Whether the pulse from the pulse generator 166 is to be counted up or down in the counter 164 is determined by a signal obtained from a motor control 168. When the motor control 168 controls the motor 62 to rotate in one direction, counting up is effected in the counter 164. On the other hand, when the motor control 168 controls the motor 62 to rotate in the other direction, counting down is effected in the counter 164. In the comparator 162, the difference in value in the BCD signal between that from the switch circuit 160 and that from the up-down counter 164 is calculated and is applied to the motor control 168. When the difference is positive, that is, when the BCD signal from the switch circuit 160 is larger than that from the up-down counter 164, the motor control 168 controls the motor 62 to rotate in said one direction. On the other hand, when the difference is negative, that is, when the BCD signal from the switch circuit 160 is smaller than that from the up-down counter 164, the motor control 168 controls the motor 62 to rotate in said other direction. By all means, when the BCD signals from the switch circuit 160 and from the up-down counter are equal, the comparator 162 produces zero level signal to maintain the motor 168 in an inoperative condition.

After the motor control 168 is actuated to position the arm 72 to such required position as selected by the pushing of one of the button switches 14a to 14i, the up-down counter 164 produces the BCD signal indicative of the position of the arm 72. This BCD signal from the up-down counter 164 is applied to a decoder 170 which decodes the BCD signal to a normal signal. For example, when the BCD signal from the up-down counter 164 is indicative of numeral "3", a high level signal is produced from a third output terminal of the decoder 170. In general, the decoder 170 produces a high level signal from one of the output terminals which corresponds to the BCD signal obtained from the up-down counter 164.

The output terminals of the decoder 170 are, respectively, connected through inverters N1 to N8 to light emitting diodes D1 to D8. Each of the diodes D1 to D8 is in turn connected through a suitable resistor to a common source of electric power +V. It is to be noted that the diodes D1 to D8 correspond to the indication lamps 18b to 18i, respectively, shown in FIG. 2.

In addition to above, the output terminals of the decoder which correspond with the button hole cams are connected to an OR gate 172 so that when button hole sewing is carried out, the OR gate 172 produces high level signal therefrom. The output of the OR gate 172 is connected to one inputs of AND gates 174 and 176. The other inputs of the AND gates 174 and 176 are connected to Q and Q terminals of a flip-flop 178. Since this flip-flop 178 is operated when the switch button 14a is pushed, the terminals Q and Q alternately produce high level signal therefrom as the switch button 14a is repeatedly pushed. The outputs of the AND gates 174 and 176 are respectively, connected through inverters N9 and N10 to light emitting diodes D9 and D10. Each of the diodes D9 and D10 is in turn connected through a suitable resistor to a common source of electric power +V. It is to be noted that the diodes D9 and D10 correspond to the indication lamps 16a and 16b, respectively, shown in FIG. 2.

Since, according to the present embodiment, the button hole sewing includes two individual sewing operations, each in the form of L-shape, the select button switch 14a provided for the button hole sewing is pushed successively twice, one for carrying out the first L-shaped stitches and the other for carrying out the second L-shaped stitches. Furthermore, according to the present embodiment, three cams in the cam arrangement 52 are used for completing the button hole sewing. A mechanism for applying the cam follower 72 to the three cams for the button hole sewing as the button switch 14a is pushed is described in detail in our previous application Ser. No. 45,762, therefore, the detailed description therefor is omitted for the sake of brevity.

The output of the OR gate 172 is also applied to one of the three inputs of an AND gate 178 and also through an inverter 180 to one input of an AND gate 182. The other two inputs of the AND gate 178 are connected, respectively, to a pulse generator 183 which generates a train of pulses used for warning the erroneous combination described above, and to a common junction J1. The other input of the AND gate 182 is connected through the common junction J1 to the switch 14a. A switch 184 which is constituted by a reed switch provided adjacent the arm 142 (FIG. 3) is connected to the common junction J1 for applying a voltage when the dial 20 is turned to the position "S". Furthermore, the common junction J1 is connected to the ground through a resistor 186 and also through a suitable resistor 171 and an inverter 173 to one input of an AND gate 175. The other input of the AND gate 175 is connected through an inverter 177 to the output of the OR gate 172. The output of the AND gate 175 is connected to one input of an OR gate 188. The other input of the OR gate 188 is connected to the output of the AND gate 178. The output of the AND gate 178 is also connected to one input of an AND gate 190. The other input of the AND gate 190 is connected to the common junction J1. The output of the OR gate 188 is connected through an inverter N11 to a light emitting diode D11. The light emitting diode D11 is in turn connected through a suitable resistor to the common source of electric power +V.

The outputs of the AND gates 182 and 190 are respectively connected to two inputs of an OR gate 192 which is in turn connected through an inverter N12 to a light emitting diode D12. The light emitting diode D11 is in turn connected through a suitable resistor to the common source of electric power +V. The common junction J1 is also connected through an inverter N13 to a light emitting diodes D13 which is in turn connected through a suitable resistor to the common source of electric power +V. The operation of the control circuit in general is described hereinafter.

Assuming that the arm 72 is now in engagement with the fifth cam from the uppermost cam in the cam arrangement 52, the up-down counter 164 produces BCD signal indicative of "5", thus the decoder 170 produces a high level signal from the fifth terminal. This high level signal is applied to the inverter N5 so that the light emitting diode D5 can be lit.

In the next step, if the seventh button 14g from the top is pushed, the switch circuit 160 produces a BCD signal indicative of a numeral "7". This BCD signal of "7" is compared with the BCD signal from the up-down counter 164. Since the arm 72 is now in contact with the fifth cam as described above, the counter 164 provides BCD signal of "5" to the comparator 162. The result of the comparison is that the BCD signal from the switch circuit 160 is greater by "2" than the BCD signal from the counter 164. Therefore, the motor control 168 actuates the motor 62 to revolve in one direction to lower the level of the arm 72. During the descent of the arm 72, the pulse is applied to the counter 164 to count up the number until the number coincides with the number from the switch circuit 160, that is, "7". When the number from the counter 164 coincides with the number from the switch circuit 160, the motor control 168 stops the motor 62 to complete the step. Therefore, the decoder 170 produces a high level signal from the seventh terminal for illuminating the diode D7.

Particularly, when one of the button switches 14b to 14i is pushed, the cam mechanism is so actuated as to position the cam follower 72 to a cam which is not provided for the button hole stitches. Therefore, the OR gate 172 connected to the decoder 170 produces a low level signal to the AND gates 174, 176 and 178 and to OR gates 177 and 180. The low level signal applied to the AND gates 174 and 176 prevents the high level signal produced from either one of the outputs Q or Q from being applied to the inverter N9 or N10. Therefore, neither one of the light emitting diodes D9 or D10 is actuated. The low level signal applied to the AND gate 178 prevents the pulse signal produced from the pulse generator 183 from being transmitted through the AND gate 178. Furthermore, the low level signal applied to the inverter 177 is inverted into high level signal which is then applied to the AND gate 175. The low level signal applied to the inverter 180 is inverted into a high level signal for actuating the AND gate 182.

In the above described condition, that is, when one of the button switches 14b to 14i is pushed, the pitch control dial 20 can be turned to any desired position for obtaining various combinations. When the dial 20 is set to one of the numerals, the switch 184 is maintained open. Accordingly, a low level signal is present at the common junction J1. This low level signal is applied to the AND gates 182 and 190 thus applying low level signals to the OR gate 192 which then produces a low level signal to the inverter N12. Therefore, the inverter N12 produces a high level signal for substantially disabling the light emitting diode D12. The low level signal at the common junction J1 is also applied to the inverter N13 in which the low level signal is inverted into high level signal for disabling the light emitting diode D13. The low level signal at the common junction J1 is further applied through the resistor 171 and inverter 173 to the AND gate 175 for providing high level signal to the OR gate 188. This high level signal applied to the OR gate 188 is inverted into a low level signal in the inverter N11 for actuating the light emitting diode D11 to generate light. Therefore, the indication lamp 26b shown in FIG. 2 is lit.

In the above described condition and when the dial 20 is set to the position "S", the switch 184 is closed for applying a high voltage signal to the common junction J1. This high level signal is applied to the inverter N13 in which the high level signal is inverted into low level signal for actuating the light emitting diode D13. Therefore, the indication lamp "S" shown in FIG. 2 is lit. In addition, the high level signal is also applied through the AND gate 182 and OR gate 192 to the inverter N12 in which the high level signal is inverted into low level signal for actuating the light emitting diode D12. Therefore, the indication lamp 24a is also lit. In the above described case, the light emitting diode D11 is not lit since the high level signal produced from the junction J1 transmitted through the resistor 171, inverter 173, AND gate 175, OR gate 188 and inverter N11 provides high level signal to the diode D11.

In the condition described above, in which the switch 184 is turned on, the turning on of the switch 14a does not at all operate the control circuit to change condition thereof since the terminal of the switch 14a which is in common with the switching circuit 160 is generally maintained at high level. In other words, during the switch 184 is turned on, turning on operation of the switch 14a does not provide any control signal, which should be a low level signal, to the switching circuit 160.

On the other hand, when the switch 14a is previously pushed while the switch 184 is opened, a low level signal is applied through the switch 14a to the switching circuit 160. In this case, the cam mechanism is so actuated as to position the cam follower 72 to a cam which is provided for effecting the button hole stitches. Therefore, the OR gate 172 connected to the decoder 170 produces a high level signal to the AND gates 174, 176, 178 and inverters 177, 180. The high level signal applied to the AND gates 174 and 176 allows the flip-flop 178 to provide high level signal to either one of the inverters N9 or N10 so that either one of the light emitting diodes D9 or D10 is lit. The high level signal applied to the inverter 177 disables the AND gate 175 while the same applied to the inverter 180 disables the AND gate 182. Since the switch 184 is opened, neither one of the light emitting diodes D11, D12 or D13 is actuated to produce light.

In the condition described above, that is, the switch 14a is pushed to effect button hole stitches, if the operator turns on, by mistake, the switch 184 as he turns the dial to the position "S", a high level signal is applied to the junction J1 and in turn to the input of the AND gate 178. Thus, the pulse from the pulse generator 183 is transmitted through the OR gate 188 and inverter N11 to repeatedly turn on and off the light emitting diode D11. In a similar manner, the pulse signal from the AND gate 178 is applied to the AND gate 190 together with the high level signal from the junction J1. Thus, the pulse transmitted through the AND gate 190 is applied through the OR gate 192 and inverter N12 to the light emitting diode D12. Therefore, the light emitting diode D12 is also repeatedly turned on and off simultaneously with the diode D11. Such blinking of the diodes D11 and D12 is a warning signal for noticing that the erroneous combination is taking place. In this case, the operator may turn the dial 20 from the position "S" to any other position or may push button switch other than switch 14a for removing the warning signal and for establishing a proper combination.

Figure 7:
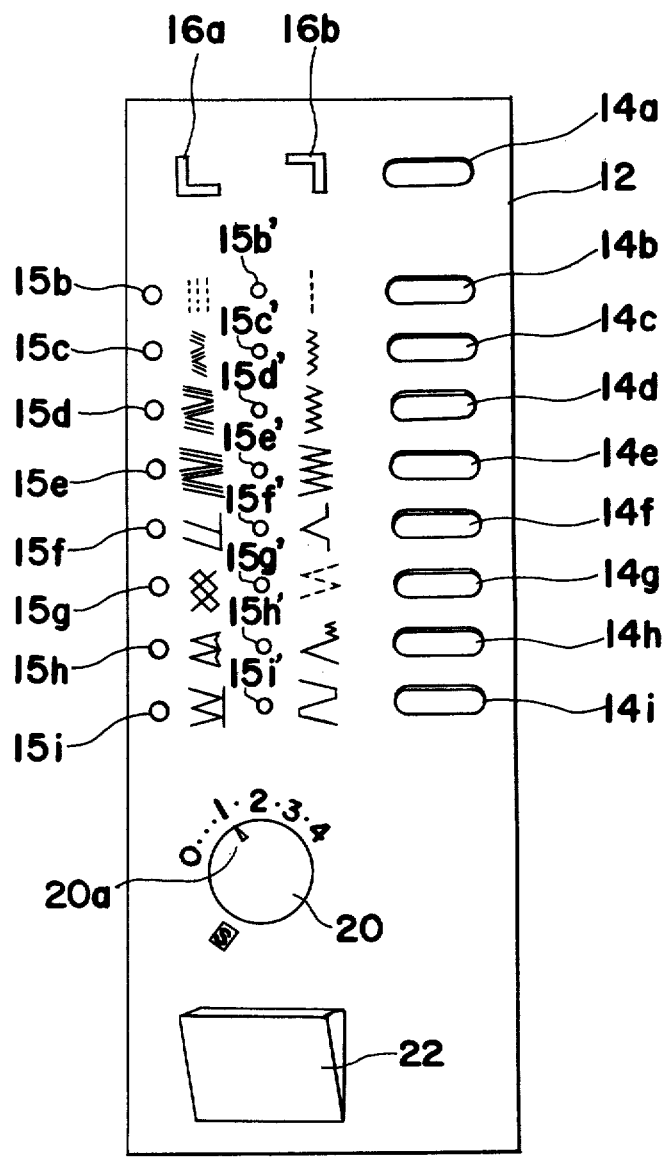
FIG. 7 is a view similar to FIG. 2, but particularly shows a modification thereof.

Referring to FIG. 7, there is shown another arrangement of the indication lamps on the control panel 12. Instead of the arrow shaped indication lamps 24a and 24b, the arrangement shown in FIG. 7 has one indication lamp for each of the stitch patterns illustrated on the control panel 12. More particularly, indication lamps 15b to 15i are provided for the stitch patterns illustrated on the left-hand side column, while the indication lamps 15b' to 15i' are provided for the stitch patterns illustrated on the right-hand side column. The circuit for controlling these indication lamps are shown in FIG. 8.

Figure 8:
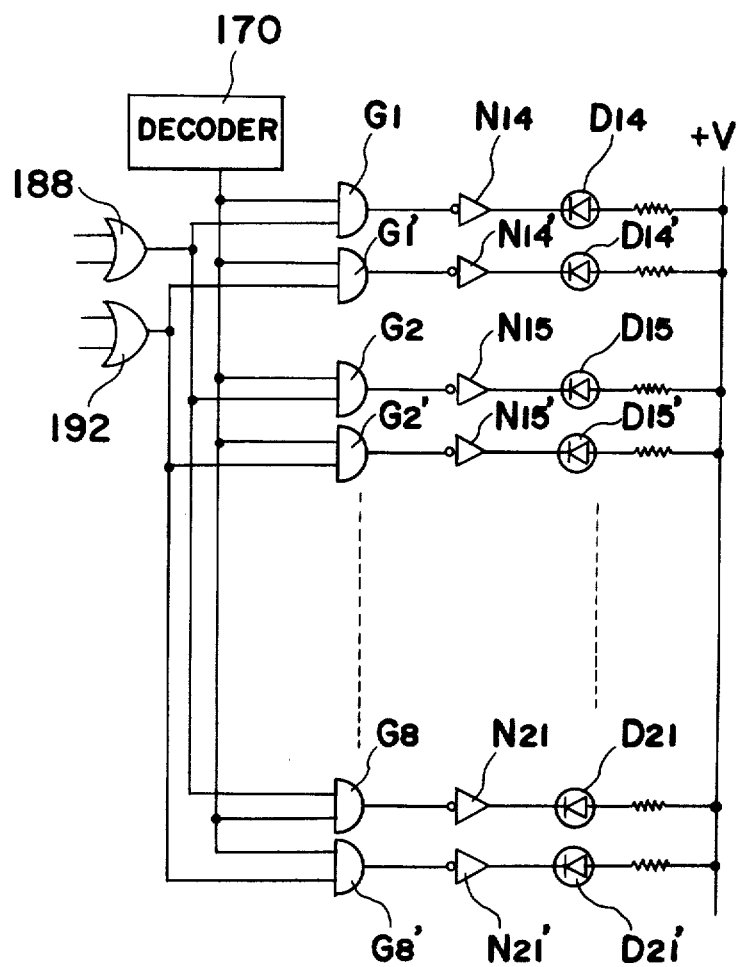
FIG. 8 is a part of circuit diagram to be employed in the circuit diagram shown in FIG. 6 for controlling lights on the control panel shown in FIG. 7.

Referring to FIG. 8, there is shown a circuit for controlling the indication lamps shown in FIG. 7, in which the circuit connected before the OR gates 188 and 192 is omitted since it is exactly the same as the circuit shown in FIG. 6. In FIG. 8, the output of the OR gate 188 is connected to one input of AND gates G1 to G8 while the output of the OR gate 192 is connected to one input of AND gates G1' to G8'. The other input of the AND gates G1 to G8 and G1' to G8' are connected to the decoder 170 in which the AND gates G1 and G1' receive a signal from the decoder 170 when the cam follower 72 is engaged to the first cam, and similarly, the AND gates G2 and G2' receive a signal from the decoder 170 when the cam follower 72 is engaged to the second cam. In general, any one of the AND gates G1 to G8 or G1' to G8' receives a signal from the decoder 170 when the cam follower 72 is engaged to a corresponding cam. The output of the AND gate G1 is connected through an inverter N14 to a light emitting diode D14. The light emitting diode D14 is in turn connected through a suitable resistor to the common source of electric power +V. In a similar manner, the outputs of the AND gates G2 to G8 are, respectively, connected through inverters N15 to N21 to light emitting diodes D15 to D21. Each of the light emitting diodes D15 to D21 is connected through a suitable resistor to the common source of electric power +V. Furthermore, the outputs of the AND gates G1' to G8' are, respectively, connected through inverters N14' to N21' to light emitting diodes D14' to D21'. Each of the light emitting diodes D14' to D21' is connected through a suitable resistor to the common source of electric power +V.

It is to be noted that light emitting diodes D14 to D21 correspond to indication lamps 15b to 15i, respectively, while the light emitting diodes D14' to D21' correspond to indication lamps 15b' to 15i', respectively.

In the above described circuit, the warning signal for noticing the erroneous combination is carried out by turning on and off the light emitting diodes D14 to D21 and D14' to D21'.

It is to be noted that warning signal which has been described as presented in the form of blinking light can be presented in other forms, such as in the form of sound. In this case, a buzzer may be so connected as to be operated by the output of the AND gate 178.

Although the present invention has been fully described by way of examples with reference to the accompanying drawings, it is to be noted that various changes and modifications are apparent to those skilled in the art. For example, the pattern information carrying means which has been described as been constituted by cam arrangement can be constituted by electric memory device using a micro-computer in which an address circuit in the memory device may be so arranged as to produce coded signal corresponding to the selected button switch. In this case, such coded signal can be used for lighting the required light emitting diodes. Therefore, such changes and modifications, unless they depart from the true scope of the present invention, should be construed as included therein.

What is claimed is:

1. A sewing machine having a plurality of switches for the selection of different sewing patterns, said sewing machine comprising:
   means for detecting an erroneous operation in the selection of the switches; and
   means for producing a warning signal when the detecting means detects the erroneous operation;
   a plurality of individual pattern information carrying means;
   a sewing information carrying means for controlling the sewing pitch in each stitch for producing an individual predetermined pattern of stitches with respect to each of the pattern information carrying means except particular pattern information carrying means; and
   adjusting means for adjusting the use of said sewing pitch information carrying means, whereby said detecting means detects the use of said sewing pitch information carrying means when the particular information carrying means is selected.

2. A sewing machine having a thread carrying needle which is reciprocated in an axial direction thereof and is jogged in a lateral direction, a cloth advancing mechanism for advancing a cloth in a direction perpendicular to the lateral direction at a controlled pitch for forming a pattern of stitches, said sewing machine comprising:
   a plurality of individual pattern information carrying means each provided for controlling the lateral movement of the thread carrying needle, at least one pattern information carrying means being provided for effecting button hole sewing;
   means for selecting any one of said pattern information carrying means;
   means for producing a selected signal indicative of the selected pattern information carrying means;
   means for adjusting the pitch of cloth advance, said adjusting means having at least two adjusting positions in which the first adjusting position is established for advancing the cloth at zero or a predetermined constant pitch, while the second adjusting position is established for advancing the cloth at a predetermined varying pitch;
   warning signal producing means; and
   circuit means connected between the selected signal producing means and the warning signal producing means for producing the warning signal when the adjusting means is positioned to the second adjusting position and, at the same time, the pattern information carrying means for button hole sewing is selected.

3. A sewing machine as claimed in claim 2, wherein said individual pattern information carrying means is a cam.

4. A sewing machine as claimed in claim 2, wherein said warning signal producing means comprises at least one light emitting element and a pulse generator coupled to the light emitting element for repeatedly turning on and off the light emitting element for producing the warning signal.

5. A sewing machine as claimed in claim 4, wherein said light emitting element is a light emitting diode.

* * * * *